Oct. 6, 1964     E. C. LARY ETAL     3,152,303

ELECTRODELESS RADIO FREQUENCY CONDUCTIVITY PROBE FOR FLUIDS

Filed June 11, 1962

INVENTORS
EDMUND C. LARY
ROBERT A. OLSON
BY David S. Fishman
ATTORNEY

United States Patent Office 3,152,303
Patented Oct. 6, 1964

3,152,303
ELECTRODELESS RADIO FREQUENCY CONDUCTIVITY PROBE FOR FLUIDS
Edmund C. Lary, Vernon, and Robert A. Olson, Manchester, Conn., assignors to United Aircraft Corporation, East Hartford, Conn., a corporation of Delaware
Filed June 11, 1962, Ser. No. 201,365
1 Claim. (Cl. 324—40)

This invention relates to a conductivity probe. More particularly, it relates to a probe for measuring the local electrical conductivity of a fluid.

Current state of the art techniques for the measurement of the conductivity of a fluid involve the use of electrodes or circuit elements which are exposed to the fluid to be measured or circuit elements surrounding the fluid to be measured. This presents serious problems of fouling and corrosion, and these problems are magnified in attempting to measure the conductivity of a plasma or of the working fluid of a magnetohydrodynamic device. Moreover, it is important in many applications to measure the local conductivity and to resolve variations in conductivity, which is not possible with previous devices.

The present invention involves the use of a probe having an inductive element encased in an envelope of insulating material. The probe is immersed in the fluid to be measured, and radio frequency current is passed through the inductive element. A magnetic field is thereby created which generates circulating azimuthal currents in the fluid to be measured thereby resulting in an ohmic dissipation of RF power proportional to the conductivity of the fluid. The power dissipated in this manner is measured, and the conductivity of the fluid is thereby determined by comparison with measurements of the power similarly dissipated in fluids of known conductivity. Since the inductive element is encased in an insulating envelope, which is immersed in the fluid, the problems attendant with the exposure of electrodes or circuit elements to the fluid are completely eliminated and a measurement can be obtained of the local conductivity of the fluid around the probe at any place in the fluid.

Accordingly, one feature of the present invention is a novel probe for the measurement of the local electrical conductivity of a fluid in which the active elements of the probe are not in contact with the fluid.

Still another feature of the present invention is a novel probe for measuring the conductivity of a fluid by causing and measuring ohmic dissipation in the fluid.

Still another feature of the present invention is a novel fluid conductivity measuring probe in which an inductive element is encased in an insulating envelope which extends into the fluid, and in which a cooling fluid is circulated within the envelope to regulate the temperature therein and maintain the inductive element at a constant temperature, thereby eliminating errors which would otherwise be produced by temperature changes of the inductor element.

Other features and advantages will be apparent from the specification and claim, and from the accompanying drawings which illustrate an embodiment of the invention, wherein:

Figure 1:
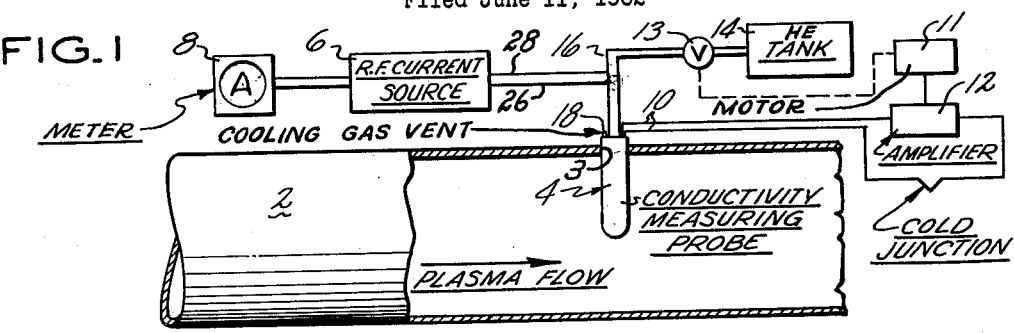
FIGURE 1 is a schematic representation of the probe and associated elements being applied to a fluid.
Figure 2:
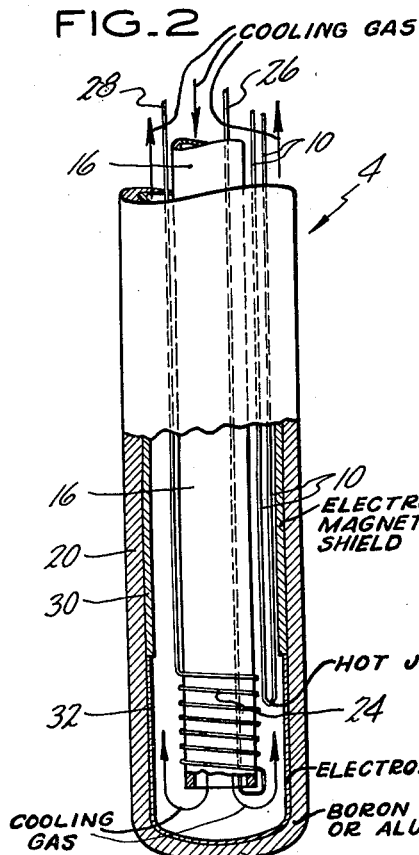
FIGURE 2 is a partial sectional view of the probe of this invention.

Referring now to FIGURES 1 and 2, conduit 2 is shown containing a plasma flow, the electrical conductivity of which is to be measured; however, it will be understood that the probe of the present invention can be used to measure the electrical conductivity of any fluid, whether a liquid or a gas, and whether moving or stationary. The probe 4 is fitted through a compatible opening 3 in the wall of conduit 2, and the opening may be provided with sealing means to prevent leakage from conduit 2. Radio frequency current source 6 delivers an RF current to an inductive element within probe 4 thereby generating circulating azimuthal currents in the fluid around the axis of probe 4. These circulating azimuthal currents dissipate power in proportion to the conductivity of the fluid, and the amount of dissipated power is measured indirectly by meter 8. The reading of meter 8 thus provides a measure of the electrical conductivity of the fluid flowing in conduit 2. The temperature of the inductive element in probe 4 is held constant to eliminate errors which might otherwise be introduced by temperature-caused changes in the resistance of the inductive element. To this end, a thermocouple 10 within a probe 4 generates an electrical signal which is amplified by amplifier 12. The output from amplifier 12 drives motor 11 which in turn positions valve 13 which is connected to a pressurized tank 14 of cooling gas such as helium or hydrogen. Valve 13 is also connected to pipe 16 which extends into probe 4. The position of valve 13 and hence the flow of cooling fluid through valve 13 is a function of the temperature within probe 4, and the cooling fluid flows into the body of probe 4 through conduit 16 and is circulated through the interior of probe 4 and then vented via vent 18 to maintain a constant temperature within probe 4.

Referring now to FIGURE 2, the envelope of probe 4 has an outer cylindrical wall 20 with a closed end 22. Both cylindrical wall 20 and closed end 22 are made of an insulating material such as boron nitride or alumina. Pipe 16 is disposed axially within the envelope of probe 4 and terminates near the closed end 22. The inductive element, coil 24, is wrapped around the end of pipe 16 at the end adjacent closure 22, and supply and return leads 26 and 28 are connected to coil 24. An electromagnetic shield 30 lines the inner surface of wall 20 approximately coextensive with the length of supply and return leads 26 and 28 are connected to coil 24. An electromagmade, for example, of silver. An electrostatic shield 32 such as platinum lines the inner surface of wall 20 and end 22 approximately coextensive with coil 24. Electromagnetic shield 30 prevents penetration into the fluid of stray magnetic fields set up around the supply and return leads to coil 24, and electrostatic shield 32 prevents penetration into the fluid of the electric field set up across coil 24 in the axial direction of the probe.

Thermocouple 10 is shown in FIGURE 2 in the probe envelope and extending along pipe 16 and having the hot junction in the vicinity of coil 24. Pipe 16 has a hollow center passage for the delivery of a flow of cooling gas to the interior of probe 4. Further protection of coil 24 from thermal effects may be achieved by placing it within pipe 16 rather than around the outside of pipe 16 as shown.

Figure 4:
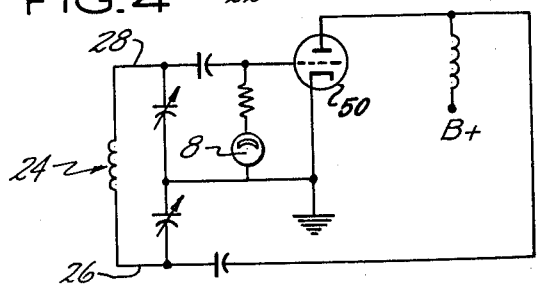
FIGURE 4 is a schematic representation of typical circuitry which could be employed with the present invention.

Referring now to FIGURE 4, a typical schematic diagram for circuitry for RF current source 6 and meter 8 of FIGURE 1 suitable for use with the probe of the present invention is shown. The circuitry shown in FIGURE 4 includes an oscillator capable of delivering RF oscillations. In addition, the coil of the oscillator tank circuit constitutes coil 24 of the probe. In other words, coil 24 is part of, or at least coupled to an oscillator tank circuit. Meter 8 is inserted in the oscillator circuit between the grid of the oscillator tube 50 and ground, and meter 8 measures grid current.

In the operation of the device shown in FIGURES 1, 2 and 4, RF current is generated and passed through coil 24, the probe 4 being immersed in a conducting fluid. The RF current passing through coil 24 generates circulating azimuthal currents in the plasma around the axis of probe 4 thereby resulting in an ohmic dissipation of power. The result is a dissipation of electrical energy, power for which must be supplied to the oscillator circuit to avoid damping out of the oscillations. That is, the impedance of the coil takes on a resistive character in an amount proportional to the power dissipation rather than the purely reactive characteristic associated with inductive energy stored in the coil. The amount of azimuthal current, and hence the dissipation of power, is proportional to the conductivity of the fluid being measured. The plate supply of the triode supplies the power to sustain tank circuit oscillations by supplying enough power to properly bias the grid and also make up for the power dissipated in the circuit.

Radio frequency energy from the tank is fed back to the grid of the triode causing grid current to flow on the positive half cycle of grid voltage. An increase in the power dissipated in the tank produces energy feedback to the grid, thereby reducing the instantaneous grid voltage and current. A decrease in grid current causes the grid bias to become more positive resulting in an increase in anode current. The power dissipated in the tank circuit is replenished by the increase in anode current. The grid current is, therefore, a measure of the power dissipated in the circuit composed of the coil 24 and the conducting fluid. Conversely, a decrease in the power dissipated in the tank increases energy feedback of the grid thereby increasing the instantaneous grid voltage and current. The increase in grid current causes the grid bias to become less positive resulting in a decrease in anode current. Thus, the increase in power dissipated in the tank circuit is compensated by a decrease in anode current.

Thus, it can be seen that the power dissipated in the circuit is made a function of the conductivity of the fluid through the coupling of the coil 24 with the fluid, and grid current is affected by the amount of power dissipation. Grid current as shown on meter 8 is a function of the conductivity of the fluid in conduit 2 and is a measure of that conductivity when referenced to measurements taken in fluids of known conductivity. Of course, an amplifier can be used to amplify the signal of grid current delivered to meter 8.

Of course, it will be apparent that this invention is not limited to the particular circuitry shown, but rather any oscillator circuit directly or indirectly magnetically coupled to the fluid and capable of measuring power dissipation can be used.

The performance of the conductivity probe depends greatly on the Q of the resonant circuit being used. It is desirable to have a high Q resonant circuit with a natural frequency low enough so that stray capacitance is not a problem, and frequencies of from 1 to 50 megacycles appear to be most appropriate.

Figure 3:
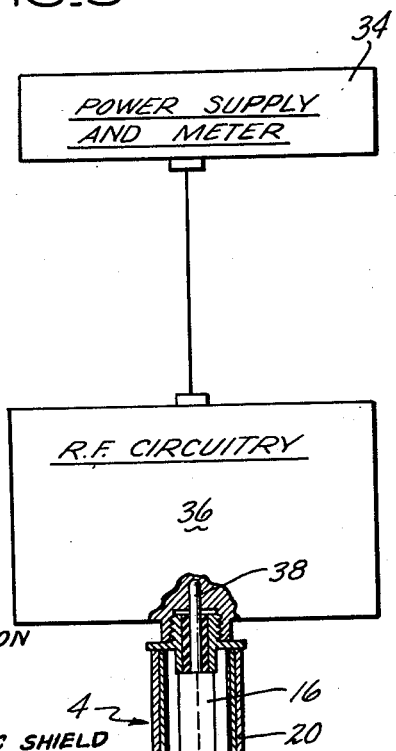
FIGURE 3 shows a coaxial cable configuration for the probe particularly suitable for a movable probe.

A structure shown in FIGURE 3 is particularly suitable for a movable probe. A D.C. power supply and meter 8 are housed in unit 34. The oscillator circuitry with the exception of coil 24 is housed in unit 36, and coil 24 is positioned within the envelope of probe 4 as in the previous configuration. In the configuration of FIGURE 3, the connection between coil 24 and the rest of the oscillator circuitry is made by means of a coaxial cable connector, the inner conductor being shown at 38 and the return path being shown at 40. The RF circuitry housed in unit 36 and probe 4 are moved from place to place as a unit thereby leaving undisturbed the distances between the elements of the circuit. In addition, the coaxial cable configuration of FIGURE 3 allows for easy substitution of probes having coils of different inductance depending upon the application involved.

It is to be understood that the invention is not limited to the specific embodiment herein illustrated and described but may be used in other ways without departure from its spirit as defined by the following claim.

We claim:

A device for measuring the conductivity of a fluid including:

a cylindrical insulating envelope with a closed end, said envelope extending into the fluid to be measured;

an axially disposed pipe within said envelope having a flow passage therethrough for a flow of cooling fluid;

an inductive element coaxial with said pipe near the closed end of said envelope;

supply and return paths within said envelope for the passage of current to and from said inductive element;

an electrostatic shield between said inductive element and said envelope;

an electromagnetic shield between said envelope and said supply and return paths;

said electrostatic shield and said electromagnetic shield being in successive abutting relationship;

means including said inductive element connected to said supply and return paths for generating and passing a radio frequency current through said inductive element to generate azimuthal currents in the fluid to be measured;

means connected to said pipe for regulating the flow of cooling fluid to regulate the temperature within said envelope;

and means coupled to said radio frequency generating means for measuring the power dissipated by said azimuthal currents.

References Cited in the file of this patent

UNITED STATES PATENTS

| | | |
|---|---|---|
| 2,623,923 | Zimmerman | Dec. 30, 1952 |
| 2,640,869 | Zimmerman | June 2, 1953 |
| 3,094,658 | Bravenec et al. | June 18, 1963 |

FOREIGN PATENTS

| | | |
|---|---|---|
| 120,078 | Australia | June 13, 1945 |